(12) United States Patent
Ogiso

(10) Patent No.: US 11,415,965 B2
(45) Date of Patent: Aug. 16, 2022

(54) CONTROL APPARATUS AND CONTROL SYSTEM

(71) Applicant: Fanuc Corporation, Yamanashi (JP)

(72) Inventor: Tarou Ogiso, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 83 days.

(21) Appl. No.: 17/083,648

(22) Filed: Oct. 29, 2020

(65) Prior Publication Data
US 2021/0149371 A1 May 20, 2021

(30) Foreign Application Priority Data
Nov. 15, 2019 (JP) .............................. JP2019-207053

(51) Int. Cl.
*G05B 19/4155* (2006.01)
*G05B 19/416* (2006.01)

(52) U.S. Cl.
CPC ....... *G05B 19/4155* (2013.01); *G05B 19/416* (2013.01); *G05B 2219/31449* (2013.01)

(58) Field of Classification Search
None
See application file for complete search history.

(56) References Cited

U.S. PATENT DOCUMENTS

| | | | |
|---|---|---|---|
| 2009/0153092 A1* | 6/2009 | Hosokawa | G05B 19/19 318/591 |
| 2016/0018813 A1* | 1/2016 | Itakura | G05B 19/406 700/175 |
| 2017/0329305 A1* | 11/2017 | Shindou | G05B 19/4155 |
| 2019/0123670 A1 | 4/2019 | Hashimoto et al. | |
| 2021/0126565 A1* | 4/2021 | Tajima | H02P 3/18 |

FOREIGN PATENT DOCUMENTS

JP  2019075961 A  5/2019

* cited by examiner

*Primary Examiner* — Ryan A Jarrett
(74) *Attorney, Agent, or Firm* — RatnerPrestia

(57) ABSTRACT

A control apparatus records commands and information about execution time of industrial machinery. The control apparatus analyzes a program, and when a command that requires preparation time exists in the program, then calculates advanced preview command time by subtracting the preparation time from time to start the execution of the command based on the execution time previously recorded. The control apparatus outputs in advance the command requiring the preparation time when the advanced preview command time comes, so as to shorten the preparation time.

11 Claims, 15 Drawing Sheets

OUTPUT OF MAGNETIC FLUX WHEN $n\tau$ HAS PASSED AFTER EXCITING CURRENT IS VARIED FROM 0 TO 100 %
($n$: INTEGAR, $\tau$: TIME CONSTANT)

| n | 1 | 2 | 3 | 4 | 5 | 6 | 7 |
|---|---|---|---|---|---|---|---|
| OUTPUT % | 63.2 | 86.5 | 95.0 | 98.2 | 99.3 | 99.8 | 99.9 |

MAGNETIC FLUX BECOMES APPROXIMATELY 100 % WHEN TIME CONSTANT IS 4 TO 7 TIMES LONGER

US 11,415,965 B2

CONTROL APPARATUS AND CONTROL SYSTEM

RELATED APPLICATIONS

The present application claims priority to Japanese Patent Application Number 2019-207053 filed on Nov. 15, 2019, the disclosure of which is hereby incorporated by reference herein in its entirety.

BACKGROUND OF THE INVENTION

1. Field of the Invention

The present invention relates to a control apparatus and a control system for industrial machinery.

2. Description of the Related Art

Some machines need preparation time to go into action. For example, a spindle of a machine tool driven by an induction motor needs the preparation time. The induction motor conducts vector control to control torque by using magnetic flux and torque current. The magnetic flux is a first-order lag element of exciting current that requires the preparation time until the magnetic flux rises adequately.

An increase in the magnetic flux of the induction motor leads to higher responsivity of the spindle, thereby increasing torque output. On the other hand, the increase in the magnetic flux causes an increase in power consumption and heat generation in the motor. Thus, the control of the induction motor regulates the amount of the exciting current, as appropriate, so as to reduce the power consumption and prevent the heat generation.

More specifically, if the spindle does not need to have the high torque under light-load condition, speed control is performed to control the rotational speed of the spindle. If the spindle needs to have high torque and to be subjected to precision work, position control is performed for controlling a rotational position of the spindle. Furthermore, in the positioning of the spindle, the position control is conducted. When the control of the spindle is switched from the speed control to the position control, it is necessary to increase the magnetic flux of the induction motor. In this case, waiting time occurs because the magnetic flux is the first-order lag element of the exciting current.

FIG. 15 shows a change in the magnetic flux during the switching from the speed control (light-load) to the position control (high responsivity). When exciting current of a rotator of a motor is ramped up at time T, as the magnetic flux is a first-order lag element of the exciting current, the flux rises lagging behind the increase in the exciting current and reaches a desired level at time T1. The waiting time for the rising of the magnetic flux leads to the increase in a cycle time.

There is a known technique in which a processing programs are read out beforehand, and the control is switched from the speed control to the position control according to the programs to measure time taken for switching from the speed control to the position control, and when the measured time is equal to or less than a predetermined value, the exciting current is strengthened to increase the magnetic flux, as disclosed in Japanese Patent Application Laid-Open No. 2019-75961, by way of example.

It is not easy to measure the time accurately according to the processing programs. In addition to that, the programs read out beforehand may include specific programs created by a user. It is difficult to measure the execution time for such programs.

SUMMARY OF THE INVENTION

In the controlling of the industrial machinery, a technology for shortening the preparation time to go into action is desired.

According to an aspect of the present disclosure, provided is a control apparatus that outputs a set of commands to an industrial machine, which includes a command that needs preparation time for actuating the industrial machine, to thereby control an operation of the industrial machine, comprising: an execution time memory that actually operates the industrial machine to record the commands for the industrial machine and execution time of the industrial machine actually operated on a basis of the commands, which are associated with each other; an advanced preview command time calculating section that calculates advanced preview command time based on the time recorded in the execution time memory by subtracting the preparation time from time to start execution of a command that requires the preparation time; and an advanced preview command outputting section that outputs in advance the command requiring the preparation time based on the advanced preview command time.

According to another aspect of the present disclosure, provided is a control system that outputs a set of commands to an industrial machine, which includes a command that needs preparation time for actuating the industrial machine, to thereby control an operation of the industrial machine, comprising: an execution time memory that actually operates the industrial machine to record the commands of the industrial machine and execution time of the industrial machine actually operated on a basis of the commands, which are associated with each other; an advanced preview command time calculating section that calculates advanced preview command time based on the time recorded in the execution time memory by subtracting the preparation time from time to start execution of a command that requires the preparation time; and an advanced preview command outputting section that outputs in advance the command requiring the preparation time based on the advanced preview command time.

Thus, the present invention can shorten the preparation time to allow the industrial machine to go into action.

BRIEF DESCRIPTION OF THE DRAWINGS

The above and other objects and features of the present invention will become apparent from the descriptions of the following embodiments with reference to the accompanying drawings in which;

FIG. 8A is a diagram showing an exemplary advanced preview command generated by a command generator;

FIG. 8B is a diagram showing an exemplary advanced preview command generated by a command generator;

FIG. 13 is a diagram showing a relationship between a time constant and an output of magnetic flux;

DETAILED DESCRIPTION OF THE PREFERRED EMBODIMENTS

Figure 1:
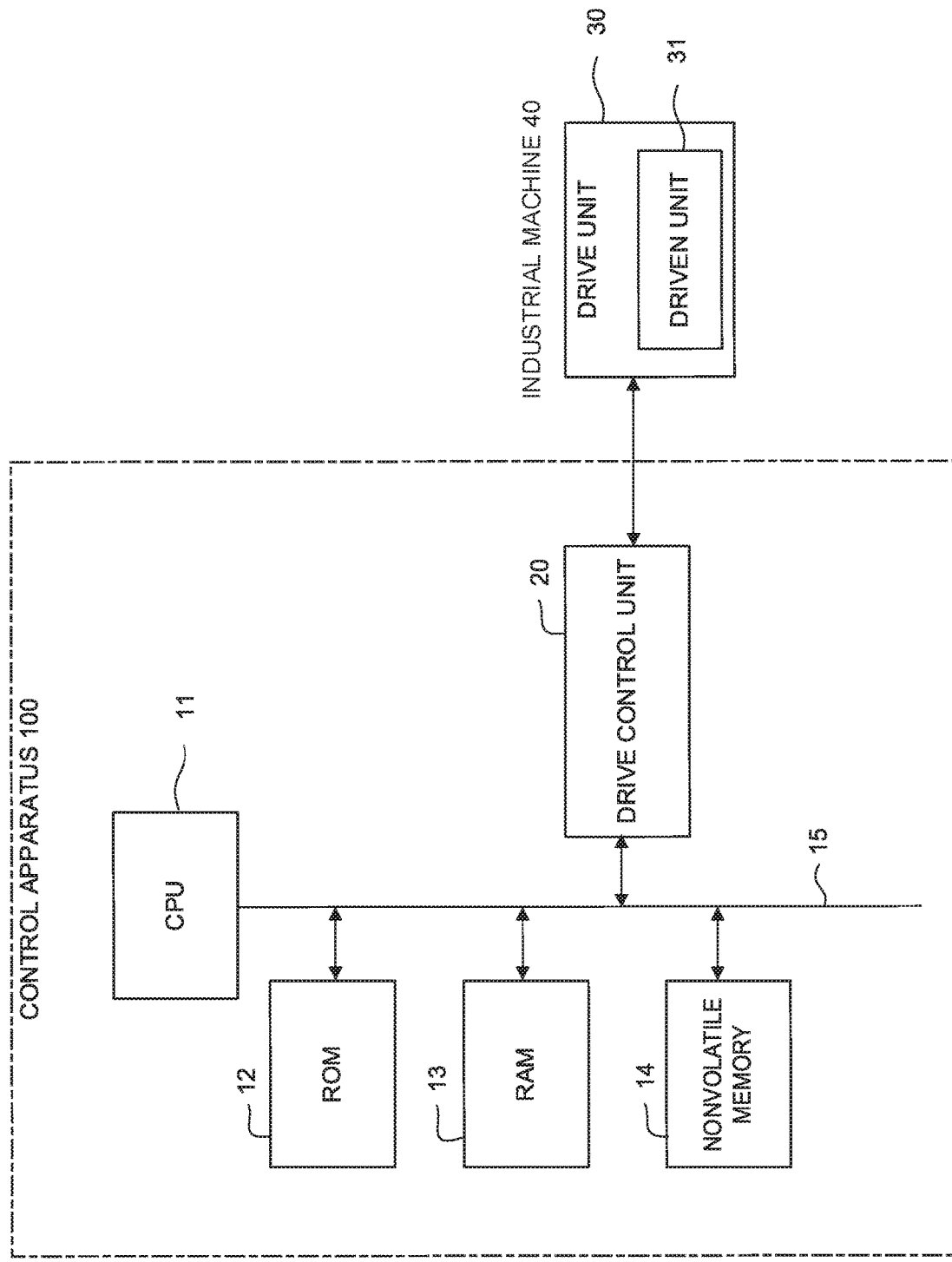
FIG. 1 is a schematic hardware configuration diagram of a control apparatus according to an embodiment.

Hereinafter, embodiments of the present disclosure will be described with reference to the drawings. FIG. 1 is a hardware configuration diagram of a control apparatus according to an embodiment. A control apparatus 100 comprises a central processing unit (CPU) 11, a read-only memory (ROM) 12, a random access memory (RAM) 13, a nonvolatile memory 14, a bus 15, and a drive control unit 20 for controlling a drive unit 30 of an industrial machine 40.

The CPU 11 is a processor that totally controls the control apparatus 100. The CPU 11 reads out a system program stored in the ROM 12 via the bus 15, so as to perform overall control on the control apparatus 100 according to the system program. The RAM 13 is storing temporary data, such as calculation data, display data and various data input by an operator for temporarily.

The nonvolatile memory 14 is configured to be backed up by a battery or equivalent, not shown, to maintain a storage state even when the control apparatus 100 is turned off. The nonvolatile memory 14 stores programs read out from an external device, not shown, and programs input through an input unit, not shown. The programs stored in the nonvolatile memory 14 are loaded in the RAM 13. In the ROM 12, written are an advanced preview command output program and the system program for overall control of the control apparatus 100 according to the present disclosure.

The drive control unit 20 performs drive control on the drive unit 30 of the industrial machine 40. The CPU 11 reads out the programs stored in the nonvolatile memory 14 to thereby output commands to the drive control unit 20. The drive control unit 20 controls the drive unit 30 of the industrial machine 40 according to the commands from the CPU 11. The drive control unit 20 varies with the type of the industrial machine 40. If the drive unit 30 is a servomotor, the drive control unit 20 may be a drive circuit intended for controlling the servomotor, a sequence controller for machine tool or press machine, by way of example.

Figure 2:
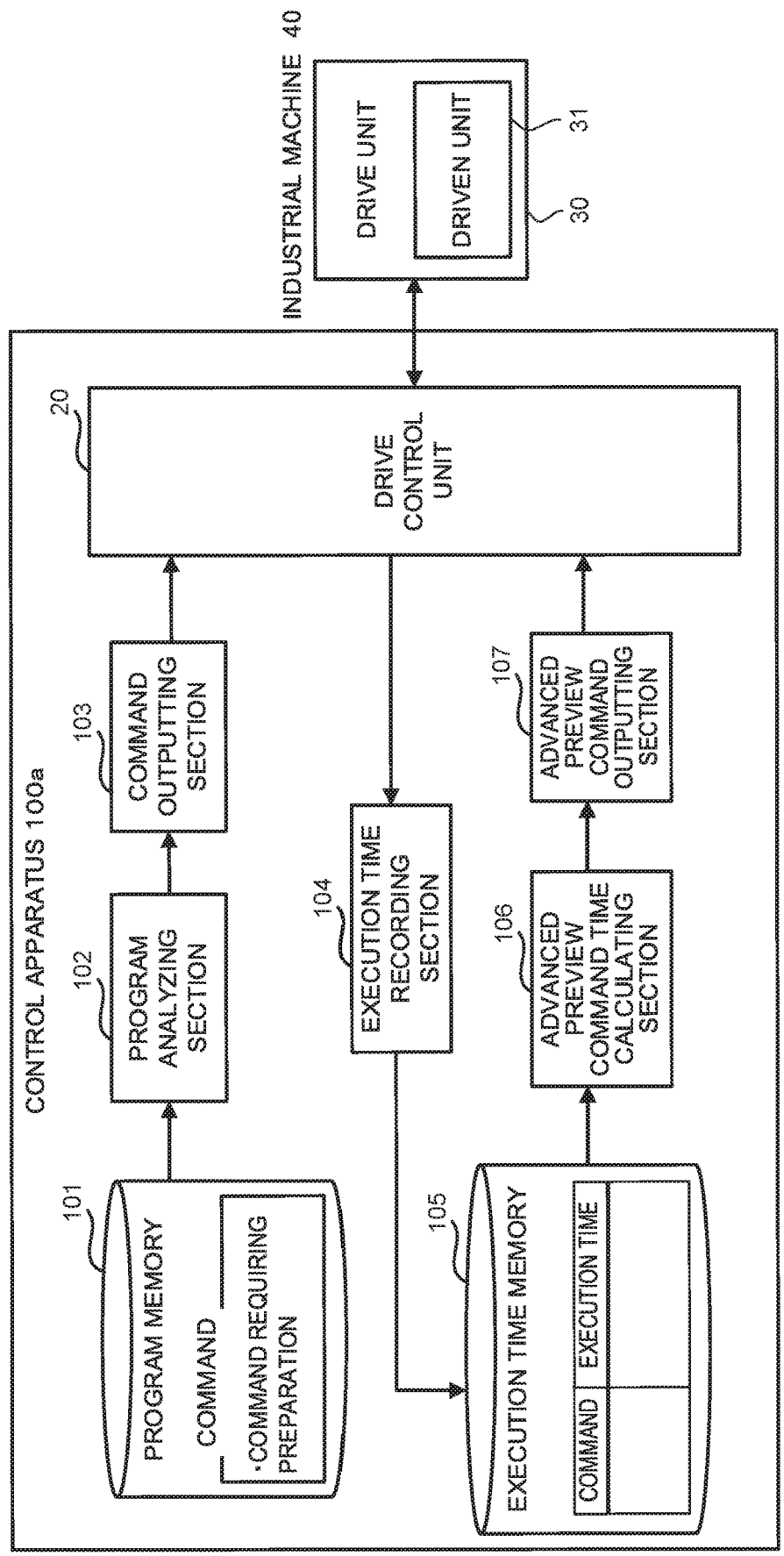
FIG. 2 is a block diagram of the control apparatus according to an embodiment.

FIG. 2 is a block diagram of a control apparatus 100a according to an embodiment of the present disclosure. The control apparatus 100a comprises a program memory 101 for storing a program composed of a series of commands, a program analyzing section 102 for analyzing the program, a command outputting section 103 for outputting the commands in the program to the drive control unit 20 of the industrial machine 40, an execution time recording section 104 for recording in an execution time memory 105 the commands output from the command outputting section 103 and execution time of the industrial machine with respect to the commands, an advanced preview command time calculating section 106 for calculating time taken to output an advanced preview command, and an advanced preview command outputting section 107 for outputting the advanced preview command time to the drive control unit 20.

The program memory 101 stores commands for allowing the industrial machine 40 to implement predetermined functions. The commands may include commands that require preparation time. The commands requiring the preparation time are for the rise of magnetic flux of an induction motor, tool replacement of a machine tool, charging of an accumulator of a press machine, charging of a capacitor, by way of example.

The execution time recording section 104 records the commands in the program and the execution time of the industrial machine 40 actually operated, in association with each other. The execution time is principally recorded during a test operation or at the beginning of the operation of the industrial machine 40. In an operation programming for machinery including the industrial machine 40, a test is carried out before the program is completed in order to check whether or not the machine works as requested. During the test or at the beginning of the operation, the machine is actually operated. The execution time taken for actual operation is more accurate than the simulation. A command originally created by a user makes it difficult to estimate the execution time based on the program. However, when the machine is actually operated, a precise execution time can be obtained easily. The execution time memory 105 stores a command and accurate execution time of the command in association with each other.

The advanced preview command time calculating section 106 calculates advanced preview command time of the command which requires the preparation time. On the basis of the advanced preview command time, the command requiring the preparation time is output. For example, in an example shown in FIG. 3, it is assumed that the industrial machine 40 sequentially executes a command 1 to a command n. Now, if a command j is the command requiring the preparation time, the advanced preview command time calculating section 106 calculates the advanced preview command time by subtracting the preparation time from the time of starting execution of the command j.

The preparation time can be set based on the specifications of the machine, experience of an engineer, general techniques and others. For example, the time necessary for the rise of the magnetic flux of the induction motor can be defined based on a time constant of the induction motor, which will be described later. The time needed for charging the accumulator and the capacitor can also be defined based on the specifications of each part. Furthermore, the preparation time can be determined on the basis of the execution time stored in the execution time memory 105.

The advanced preview command outputting section 107 outputs the command requiring the preparation time to the drive control unit 20 when the advanced preview command time comes or the predefined time before the advanced preview command time. The drive control unit 20 drives a driven unit 31 according to the command requiring the preparation time output from the advanced preview command outputting section 107. By driving the driven unit 31 in advance, the waiting time of the preparation time can be reduced. In this connection, the command does not need to be output exactly at the advanced preview command time. When the command is output before or after the advanced preview command time based on the advanced preview command time, the command will be started beforehand to thereby shorten the preparation time.

Figure 4:
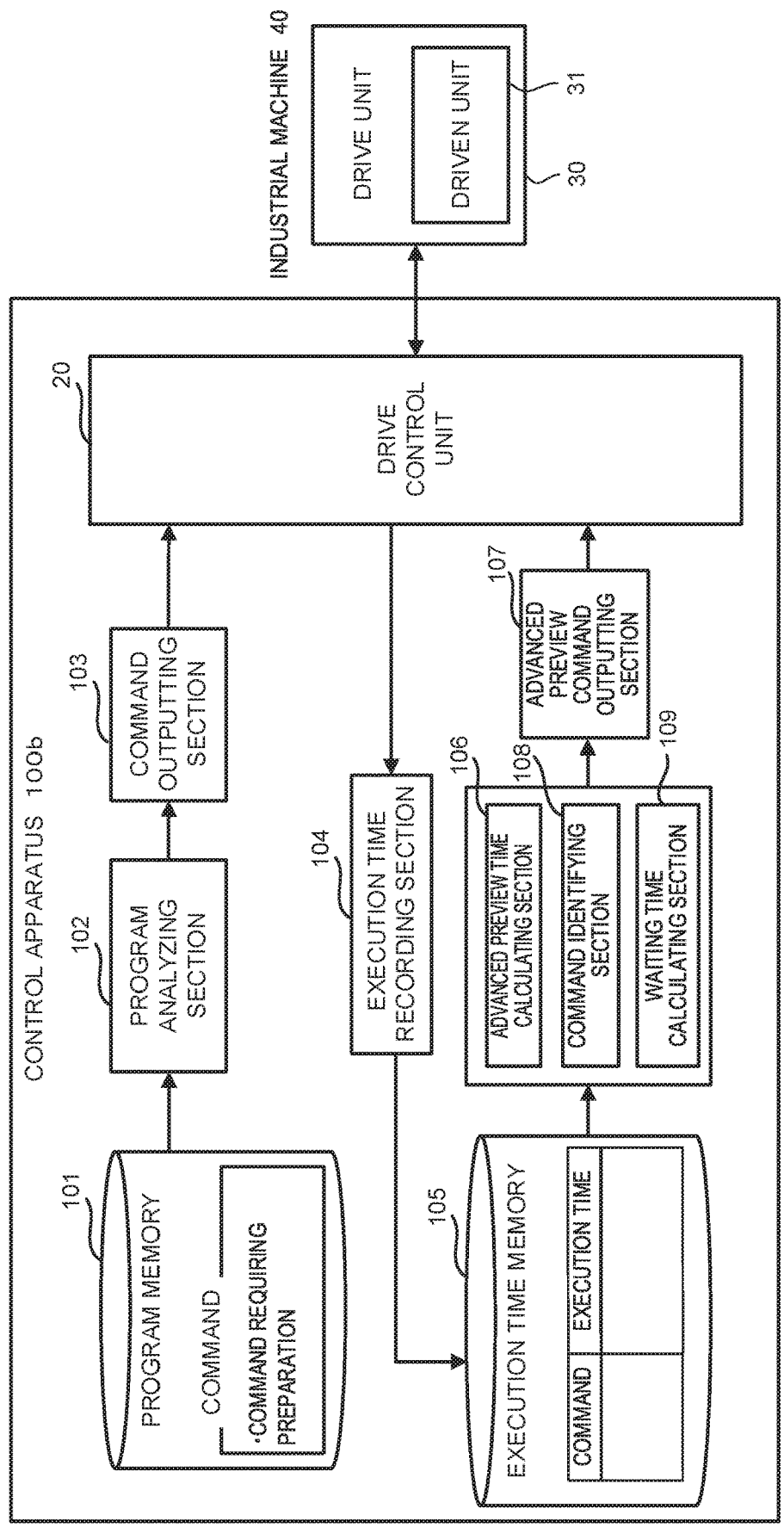
FIG. 4 is a block diagram of a control apparatus according to an embodiment.

Next, another embodiment will be described by referring to FIG. 4. A control apparatus 100b shown in FIG. 4 includes a command identifying section 108 for identifying a command that actuates the industrial machine 40 at the advanced preview command time, and a waiting time calculating section 109 for calculating the time from the beginning of the command identified by the command identifying section 108 until the advanced preview command time comes.

Figure 3:
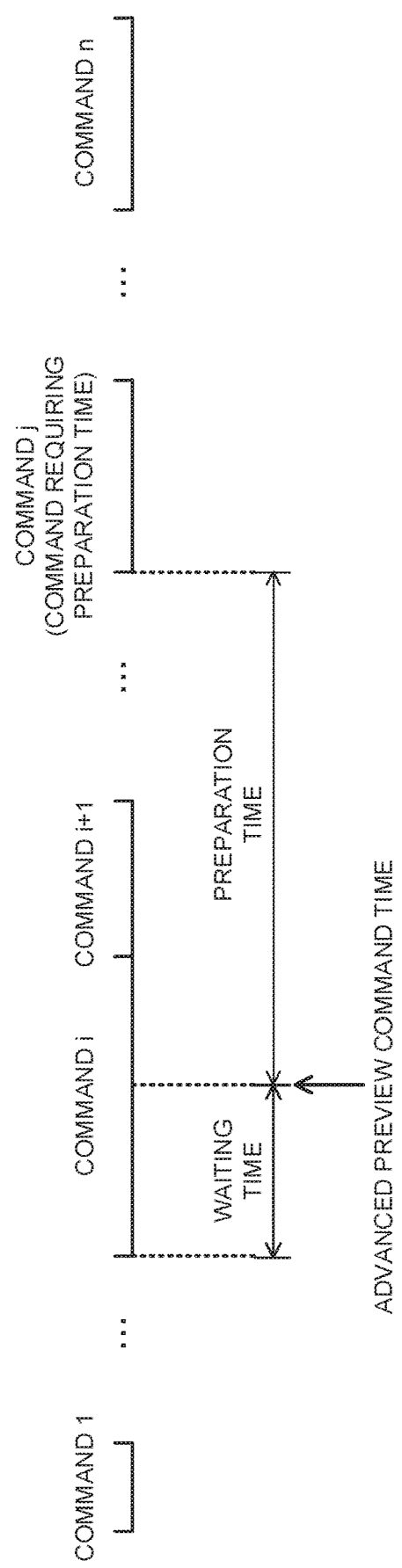
FIG. 3 is a diagram illustrating a method for calculating advanced preview command time.

The command identifying section 108 identifies the command for actuating the industrial machine 40 at the advanced preview command time when there is a command that needs the preparation time in a program. As shown in FIG. 3, the industrial machine 40 sequentially executes the command 1 to the command n and stores the execution time of each command in the execution time memory 105. The command identifying section 108 can identify a command for actuating the industrial machine 40 at the advanced preview time based on the execution time stored in the execution time memory 105. In the example of FIG. 3, the command i is the command for actuating the industrial machine 40 at the advanced preview command time.

The waiting time calculating section 109 calculates waiting time that is the time from the actuation of the industrial machine 40 according to the command i identified by the command identifying section 108 until the advanced preview command time comes. The waiting time can be calculated by subtracting the time to start the execution of a command i from the advanced preview command time.

The advanced preview command outputting section 107 outputs the command that requires the preparation time after the actuation of the industrial machine 40 according to the command identified by the command identifying section 108, after the approximately waiting time.

Figure 5:
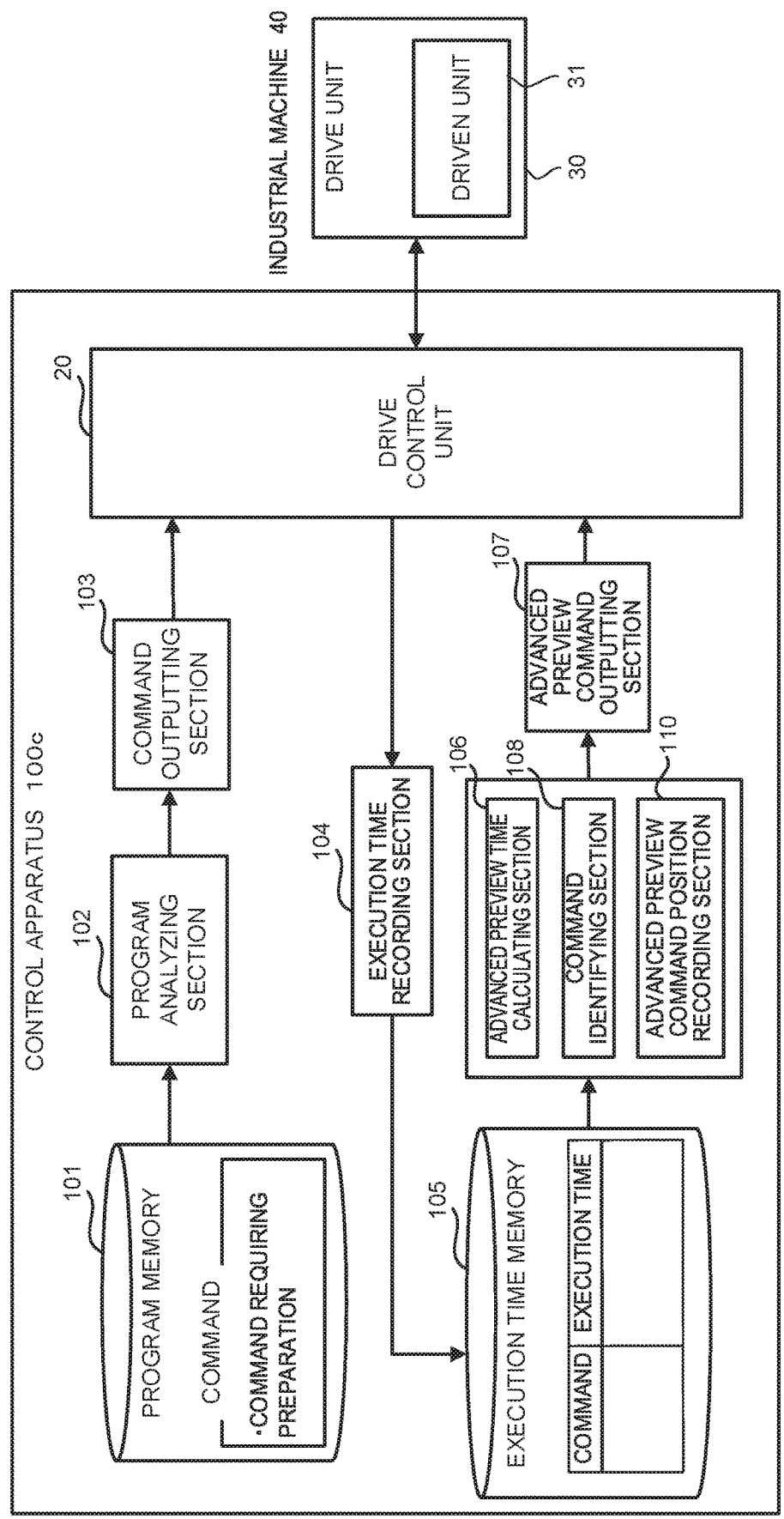
FIG. 5 is a block diagram of a control apparatus according to an embodiment.

Now, another embodiment will be described with reference to FIG. 5. A control apparatus 100c of FIG. 5 comprises the command identifying section 108 and an advanced preview command position recording section 110, and the advanced preview command outputting section 107 outputs an advanced preview command on the basis of the position of the driven unit 31.

The advanced preview command position recording section 110 obtains the position and a direction of movement of the driven unit 31 so as to record the position and the direction of movement of the driven unit 31 at the advanced preview command time.

The advanced preview command outputting section 107 monitors the position and the direction of movement of the driven unit 31 when the industrial machine 40 is actuated according to the command identified by the command identifying section 108, and outputs in advance the command that requires the preparation time when the driven unit 31 moves at the position recorded by the advanced preview command position recording section 110 in the direction of movement recorded by the advanced preview command position recording section 110 or when the driven unit 31 is in the vicinity of the above-described position. The driven unit 31 of the industrial machine 40 may be a tool of a machine tool, arms or hands of a robot, or a parts supplying device, by way of example. The driven unit 31 moves on track predefined based on the identified command.

Figure 6:
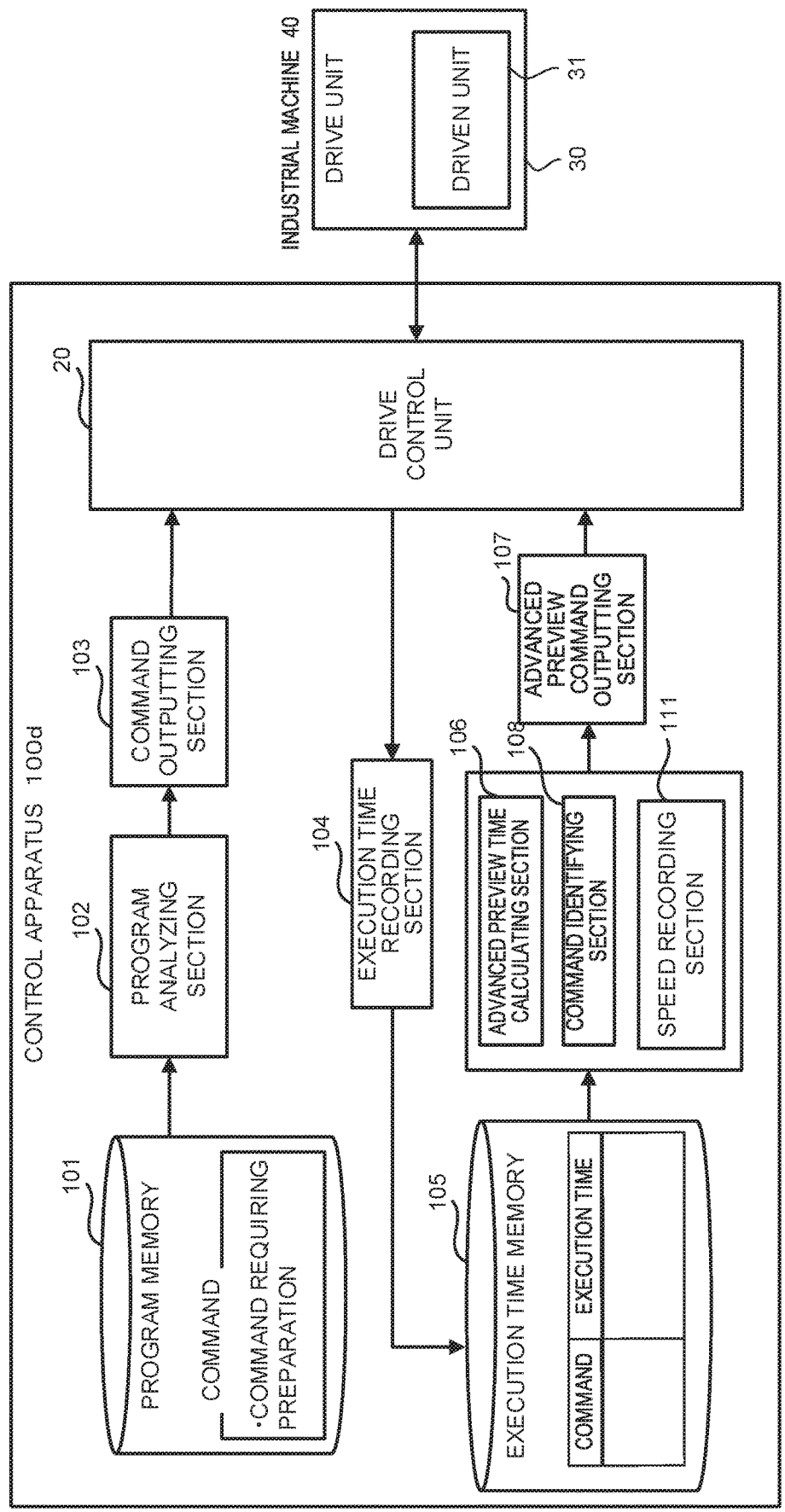
FIG. 6 is a block diagram of a control apparatus according to an embodiment.

Next, another embodiment will be described by referring to FIG. 6. A control apparatus 100d of FIG. 6 comprises the command identifying section 108 and a speed recording section 111. The command identifying section 108 identifies a command that actuates the industrial machine 40 at the advanced preview command time if a command requiring the preparation time exists in the program.

The speed recording section 111 obtains the speed of the driven unit 31 to record the speed of the driven unit 31 at the advanced preview command time.

The advanced preview command outputting section 107 monitors the speed of the driven unit 31 in response to the command identified by the command identifying section 108 after the actuation of the industrial machine 40. When the speed of the driven unit 31 reaches the speed of the driven unit 31 at the advanced preview command time recorded in the speed recording section 111 or when the speed is at the vicinity of this recorded speed, the advanced preview command outputting section 107 outputs the command which requires the preparation time. The driven unit 31 of the industrial machine 40 is the tool of the machine tool, for instance. In the case of the machine tool, its speed is not limited to one. Since a plurality of feed spindles interpolate in the machine tool, if there are three shafts such as X-spindle, Y-spindle and Z-spindle, the speed of the machine tool will be vector (Vxd, Vyd, Vzd) that is composed of the speeds of three spindles.

Figure 7:
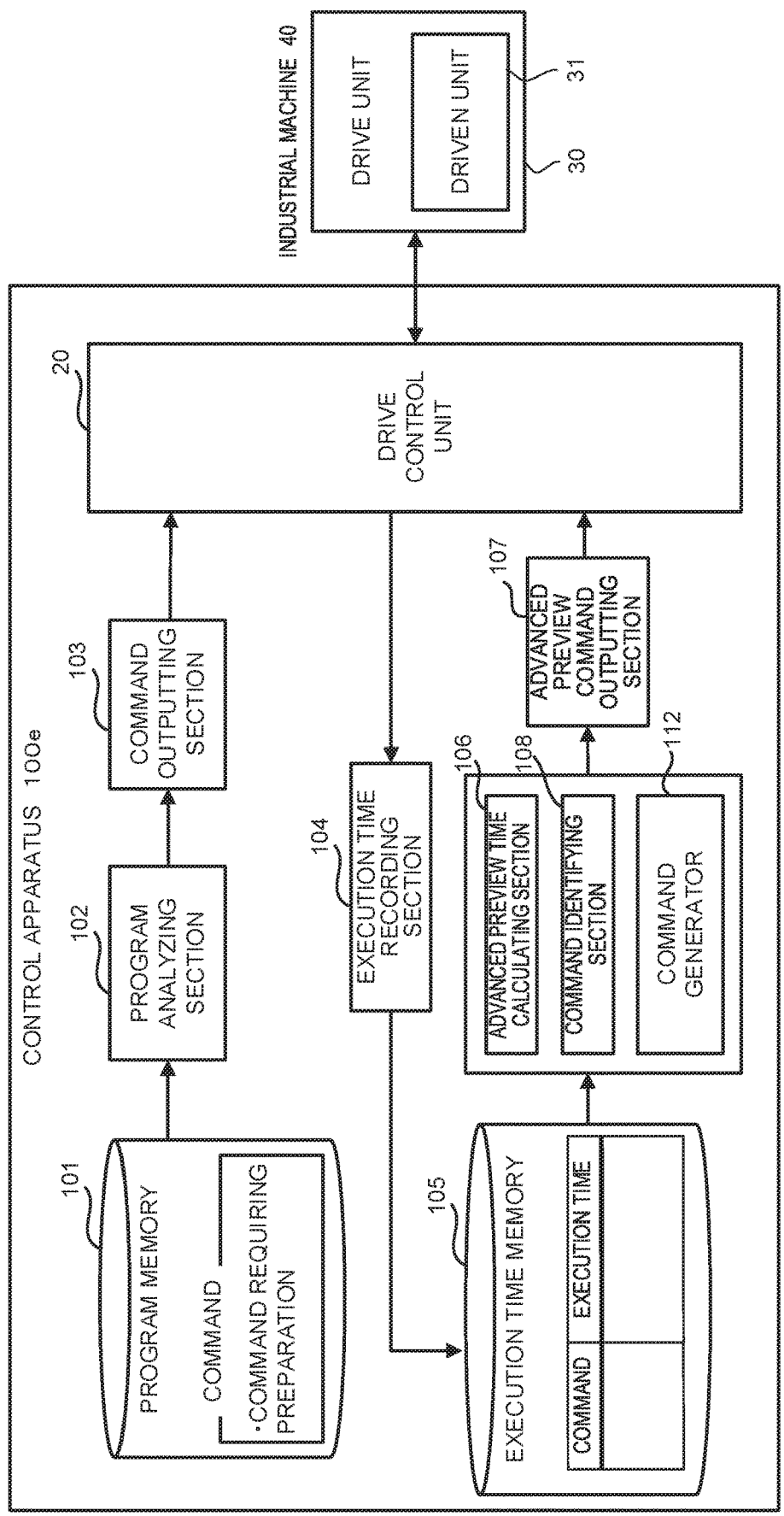
FIG. 7 is a block diagram of a control apparatus according to an embodiment.

Now, a description will be made about automatic generation of an advanced preview output command by referring to FIG. 7. A control apparatus 100e of FIG. 7 comprises the command identifying section 108 and a command generator 112. The command identifying section 108 identifies a command that actuates the industrial machine 40 at the advanced preview command time when a command requiring the preparation time exists in the program.

The command generator 112 generates a command for outputting the advanced preview command at the advanced preview command time or prior to this time, to thereby add the generated command to the command identified by the command identifying section 108. FIG. 8A illustrates a command generated by the command generator 112. A command "M999" is an example of the command for outputting the advanced preview command. In a parameter "P_" of the command "M999", the driven unit is entered, and in a parameter "Q_", time is entered. The command identified by the command identifying section 108 is "G00". The command generator 112 adds the command "M999" for outputting the advanced preview command after the command "G00" identified by the command identifying section 108. The driven unit 31 that will be driven in advance by the command "M999" is designated with the parameter "P21", and a waiting time until the advanced preview command is output is "Q500", namely 500 ms.

FIG. 8A illustrates another command generated by the command generator 112. In FIG. 8B, the parameter "Q_" is added to an existing command "M29". The command "M29" needs the preparation time. The parameter "Q500" means that the advanced preview command will be output 500 ms after implementing the command "G00" which is a command prior to the command "M29". In the case where the parameter "Q" is omitted, the command may be output in advance at the start of the command "M29". The sign of the value of Q may be inverted to output the command prior to the start of the identified command.

The program in FIG. 8A and FIG. 8B designate the advanced preview command time. Similarly, the control apparatus 100c of FIG. 5 can generate a command for designating timing to output the advanced preview command based on the position of the driven unit 31. Furthermore, the control apparatus 100*d* of FIG. 6 can generate a command for designating the timing to output the advanced preview command based on the speed of the driven unit.

Next, another embodiment will be described with reference to FIG. 9. A control apparatus 100*f* of FIG. 9 comprises a speed changing section 21 for driving the driven unit 31 of the industrial machine 40 twice as fast as the speed designated by the command, and an execution time adjusting section 113 for adjusting operation time changed by the speed changing section 21 to be normal operation time which is unchanged.

The function of the speed changing section 21 is typically called as override that is for driving the driven unit 31 at a speed zero to several times faster than the speed designated by the command. The override is a function to be used for operation check of the program, for example. In the operation check of the program, the driven unit 31 is initially moved slowly to confirm the safety of the program, and then the speed is increased upon confirmation of the safety to thereby shorten the timescale of the confirmation tasks. By conducting the override in the above way, the driven unit is driven at a speed different from that of the actual operation, and as a consequence the execution time of the industrial machine 40 differs from the actual operation time.

When the speed changing section 21 has conducted the override, the execution time adjusting section 113 uses the amount of the speed change, namely overriding value, to adjust the execution time. The execution time recording section 104 records the time adjusted by the execution time adjusting section 113 in the execution time memory 105.

Figure 9:
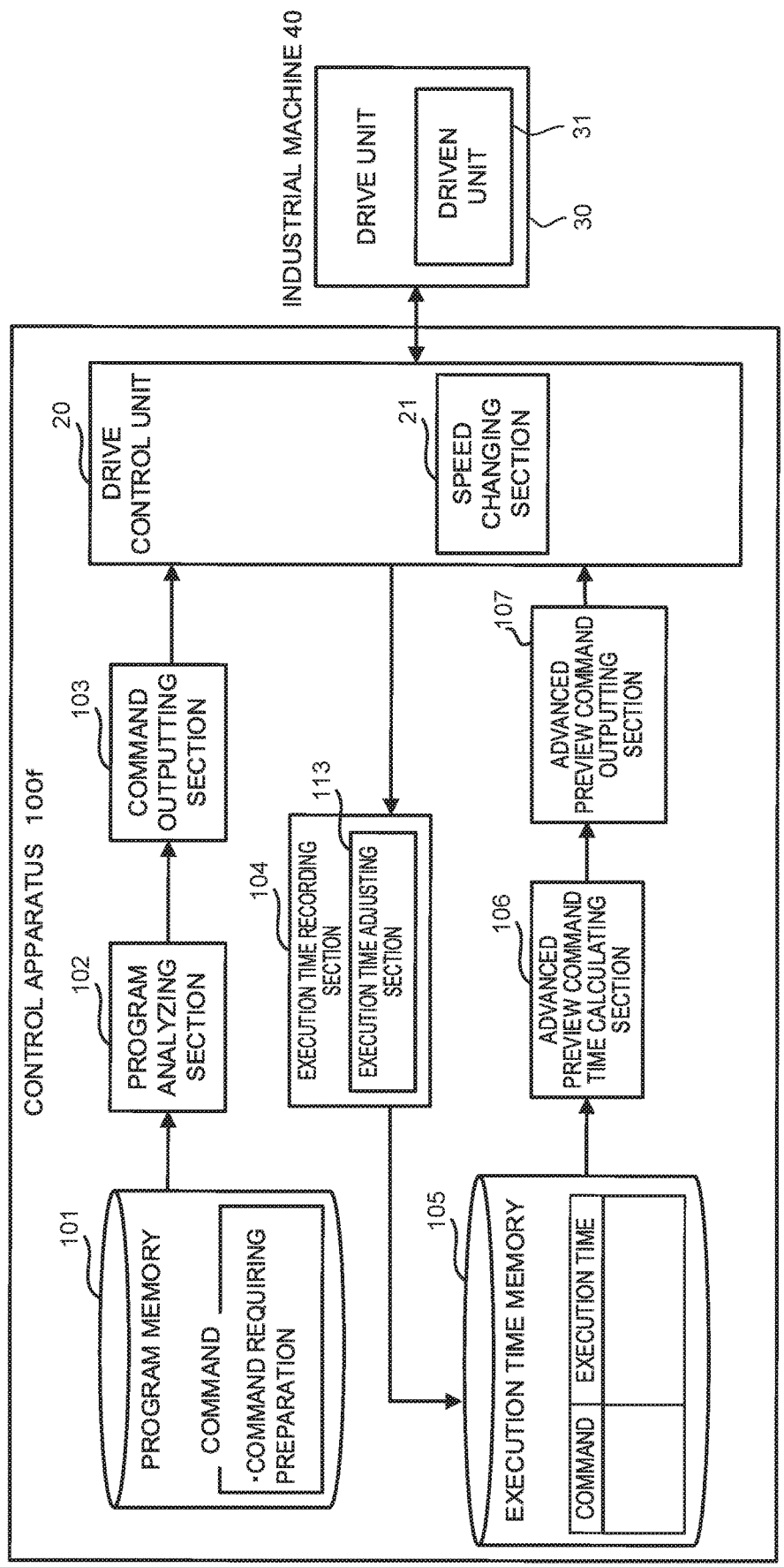
FIG. 9 is a block diagram of a control apparatus according to an embodiment.

In this way, the control apparatus 100*f* of FIG. 9 adjusts the execution time by taking into consideration the amount of speed change even if the speed of the industrial machine 40 is changed during the test operation for confirming the operation of the industrial machine 40, thereby enabling to obtain the execution time.

A description will now be made on a numerical control apparatus 100*g* of an embodiment with reference to FIG. 10. The numerical control apparatus 100*g* of FIG. 10 comprises a program memory 101 for storing a program composed of a series of commands, a program analyzing section 102 for analyzing the program, a command outputting section 103 for outputting the commands written in the program to a motor controller 20*a* of a machine tool, an execution time recording section 104 for recording the commands output by the command outputting section 103 and the execution time of the commands in association with one another to the execution time memory 105, an advanced preview command time calculating section 106 for calculating time to output an advanced preview command, an advanced preview command outputting section 107 for outputting a command in advance to the motor controller 20*a* to start a command that needs the preparation time, and a preparation time memory 114 for storing the preparation time.

Figure 11:
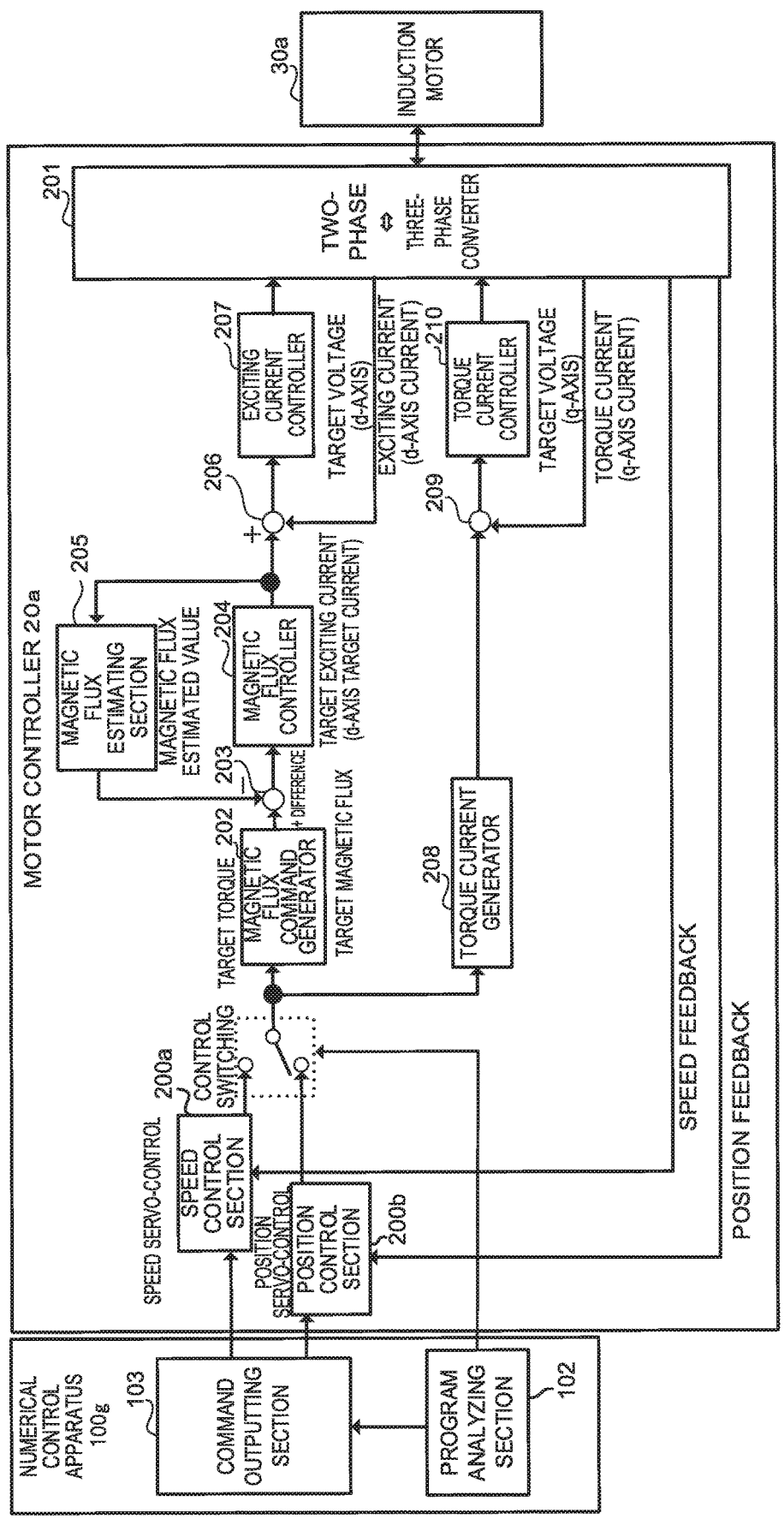
FIG. 11 is a block diagram of a motor controller according to an embodiment.

With reference to FIG. 11, a description will be made about an example of applying an embodiment of the present invention to the vector control on an induction motor 30*a*. A numerical control apparatus 100*g* of FIG. 11 comprises the motor controller 20*a* to control the induction motor 30*a*. The motor controller 20*a* corresponds to the drive control unit 20 in the other embodiment. The motor controller 20*a* of FIG. 11 comprises a speed control section 200*a* and a position control section 200*b* for controlling the induction motor 30*a*.

The motor controller 20*a* performs the vector control on the induction motor 30*a*. The vector control is carried out in such a way that control current of a three-phase AC motor is decomposed into two phases of a magnetic-field component (d-axis) and a torque component (q-axis) to adjust the magnitude of the torque in a driven unit 31, such as spindle, of the induction motor 30*a*.

A two-phase/three-phase converter 201 converts the control current from two-phase into three-phase and from three-phase into two-phase. The two-phase/three-phase inverter 201 decomposes three-phase current of the induction motor 30*a* into exciting current that generates magnetic flux (d-axis) and torque current that acts on the magnetic flux to generate torque (q-axis). Position feedback and speed feedback are fed back to the numerical control apparatus 100*g*. The control of the numerical control apparatus 100*g* is switched between a position control mode and a speed control mode. The position control mode is performed on a rotational position of the spindle, and the speed control mode is performed on a rotational speed of the spindle. In the position control mode, the position control section 200*b* outputs target torque to the motor controller 20*a*, whereas in the speed control mode, the speed control section 200*a* outputs it. The motor controller 20*a* implements the vector control according to the target torque fed by the numerical control apparatus 100*g*.

Magnetic flux command generator 202 outputs target magnetic flux according to the target torque from the speed control section 200*a* (or position control section 200*b*). A subtracting section 203 calculates a difference between the target magnetic flux generated by the magnetic flux command generator 202 and magnetic flux estimated by magnetic flux estimating section 205. Magnetic flux controller 204 outputs a target exciting current based on the difference thus calculated. A subtracting section 206 calculates a difference between the exciting current (d-axis current) in the induction motor 30*a* output from the two-phase/three-phase converter 201 and target exciting current output from the magnetic flux controller 204. An exciting current controller 207 outputs a target voltage of the d-axis based on the calculated difference.

A torque current generator 208 outputs target torque current according to the target torque of the induction motor. A subtracting section 209 calculates a difference between the target torque current generated by the torque current generator 208 and the torque current (q-axis current) in the induction motor 30*a* output from the two-phase/three-phase converter 201. A torque current controller 210 outputs a target voltage of the q-axis based on the calculated difference.

The two-phase/three-phase converter 201 converts the target voltage of the d-axis output from the exciting current controller 207 and the target voltage of the q-axis output from the torque current controller 210 into three-phase AC currents to thereby output them to the induction motor 30*a*. In this way, the motor controller 20*a* can conduct the vector control on the induction motor 30*a*.

The speed control mode concurrently performs speed servo-control by the numerical control apparatus 100*g* and the vector control by the motor controller 20*a*, and the position control mode concurrently performs position servo-control by the numerical control apparatus 100*g* and the vector control by the motor controller 20*a*. The position servo-control may include the speed servo-control.

In FIG. 11, the numeral control apparatus 100*g* is configured to have the functions of speed servo-control and position servo-control for the convenience of description about the vector control. The functions of speed servo-control and position servo-control are typically provided to the motor controller 20a. More specifically, the speed control section 200a and the position control section 200b are contained in the motor controller 20a. The speed feedback is fed back to the speed control section 200a. The position feedback is fed back to the position control section 200b. The command outputting section 103 of the numerical control apparatus 100g outputs a speed command for the speed control section 200a and a position command for the position control section 200b. The control switching is conducted to switch the target torque to be output either from the speed control section 200a or the position control section 200b. The switching is conducted according to an instruction from the program analyzing section 102 of the numerical control apparatus 100g. The position serv-control may include the speed servo-control. Even if the functions of speed servo-control and position servo-control are provided to the motor controller 20a as described above, the effect of the present invention does not differ at all.

Figure 12:
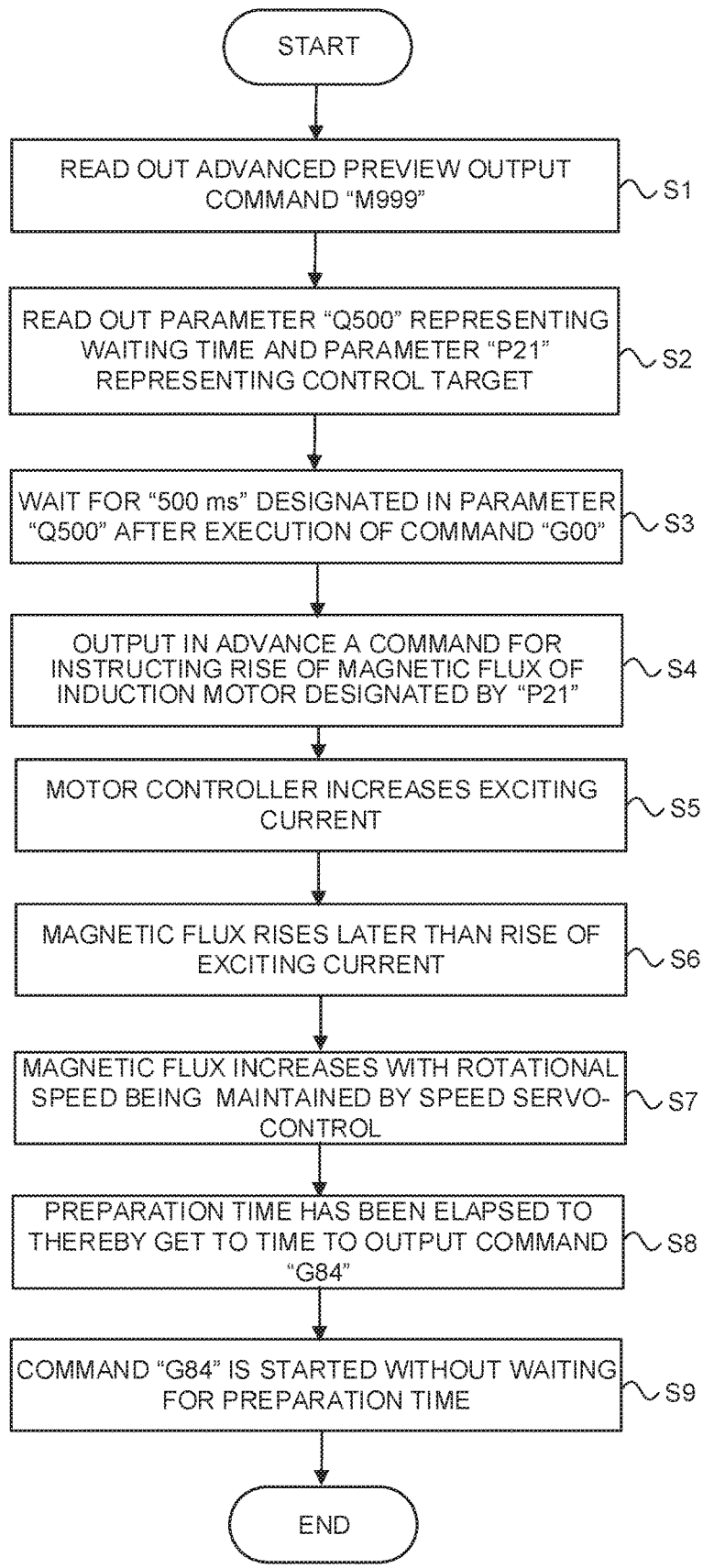
FIG. 12 is a flow chart showing a procedure for outputting in advance magnetic flux of an induction motor by using advanced preview commands.

With reference to FIG. 12, a description will be made about the rise of the magnetic flux when the speed control is switched to the position control. In this embodiment, the program presented in the FIG. 8A will be used. Provided that the command "G00" means fast forward and a command "G84" means tap processing in the FIG. 8A, the switching is conducted from "G00 (speed control)" to "G84 (position control)". The switching from the speed control to the position control needs the preparation time for the rise of the magnetic flux.

The command "G00" is followed by the advanced preview output command of "M999". The program analyzing section 102 reads out the command "M999" (Step S1), and then reads out the parameter "P500" representing the control target and the parameter "Q21" representing the waiting time (Step S2). The advanced preview command outputting section 107 of the numerical control apparatus 100g in turn waits for the waiting time "500 ms" designated in the parameter "Q500" after the execution of the command "G00" (Step S3). Then, the program analyzing section 102 outputs in advance a command for instructing the rise of the magnetic flux of the induction motor "21" designated by the parameter "P21" (Step S4).

The motor controller 20a increases the exciting current for generating the magnetic flux in response to the advanced preview command from the numerical control apparatus 100g (Step S5). Since the magnetic flux is a first-order lag element of the exciting current, the magnetic flux then begins to increase later than the rise of the exciting current (Step S6). It can be considered that the speed of the induction motor increases excessively when the magnetic flux increases with the rise of the exciting current, but it does not actually increase. The induction motor is, as shown in FIG. 11, affected by the vector control as well as the speed servo-control and the position servo-control. The speed servo-control responds faster than the magnetic flux. Even if the torque is increased by strengthening the magnetic flux, the target torque and the torque current decrease under the influence of the speed servo-control, and thus there is no significant change in the rotational speed of the spindle. Accordingly, if the magnetic flux of the induction motor is strengthened during cutting work, any problem does not arise. After the exciting current is increased, the magnetic flux increases with the speed of the spindle being maintained constant (Step S7).

After Step S5, when the preparation time has been elapsed, the time comes to output the command "G84" by the command outputting section 103. At this time, the numerical control apparatus 100g switches the command from "G00" for the speed control to "G84" for the position control (Step S8). That is to say, the rise of the magnetic flux is implemented in advance. As a consequence, when the speed control is turned to the position control, the command "G84" can be started without waiting the preparation time of the induction motor (Step S9).

Figure 10:
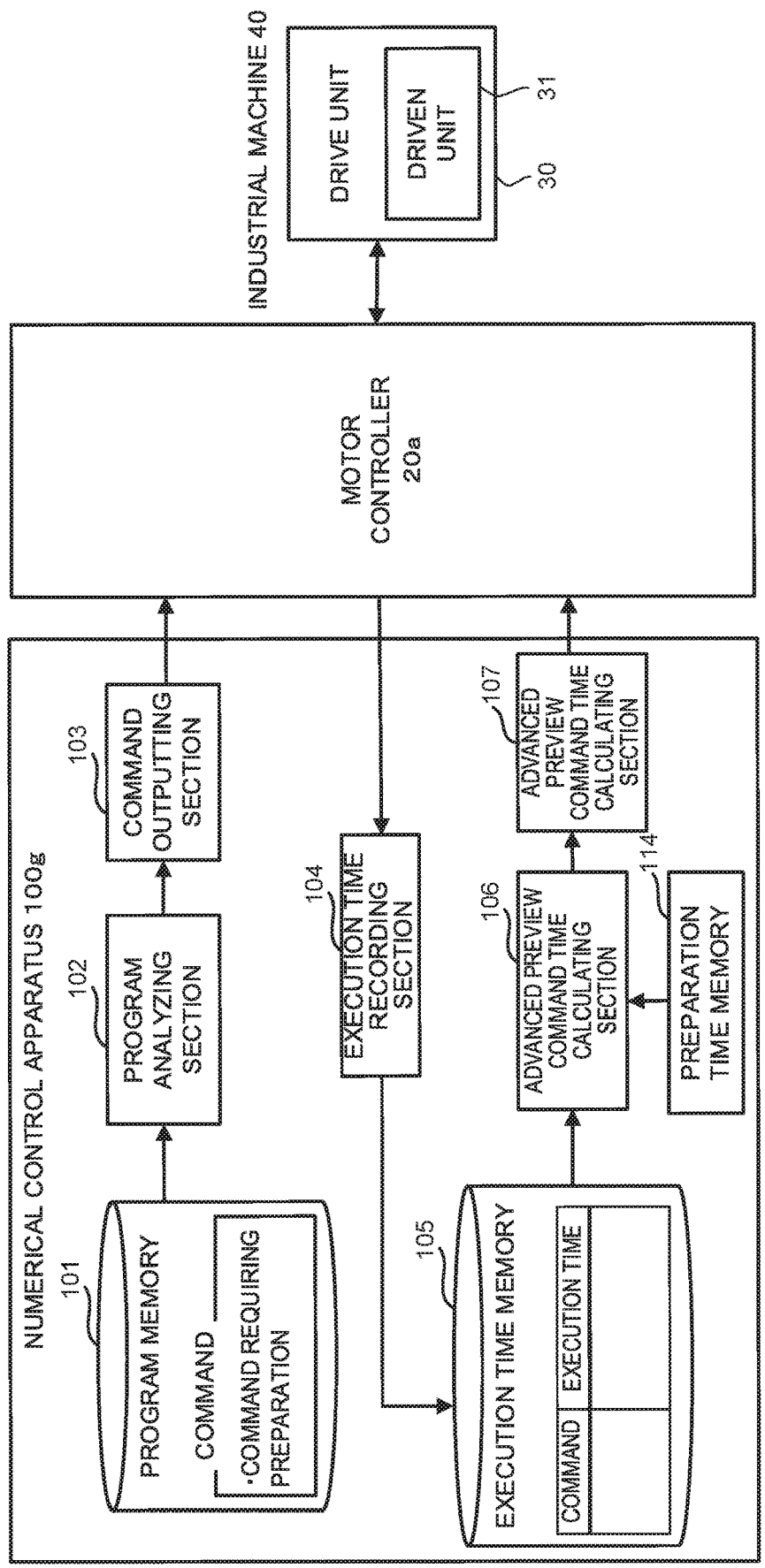
FIG. 10 is a block diagram of a numerical control apparatus according to an embodiment.

In the preparation time memory 114 in FIG. 10, the preparation time required for the rise of the magnetic flux is set. This preparation time is based on the time constant of the induction motor. FIG. 13 shows the change in the magnetic flux when the exciting current is varied from 0% to 100%. Provided that n is an integer and $\tau$ is a time constant, the output of the magnetic flux when the time constant $\tau$ has passed after the rise of the exciting current is 63.2%, and the output of the magnetic flux after a lapse of $2\tau$ is 86.5%. The output is 98.2% after a lapse of $4\tau$, and is 99.9% after a lapse of $7\tau$. Thus, as the output becomes approximately 100% after a lapse of the time constant four to seven times longer than the time constant at the rise of the exciting current, it is therefore preferable to set a value of the preparation time four to seven times larger than the time constant in the preparation time memory 114. In this way, the preparation time can be set on the basis of the specifications of the machine, experience of an engineer, general techniques and others.

As described above, in this embodiment, the information about the command and the execution time is recorded during the test operation or the initial operation of the industrial machine 40. The control apparatus 100 analyzes the programs, and when the command requiring the preparation time exists in the program, then calculates the advanced preview command time by subtracting the preparation time from the time to start the execution of the command based on the previously recorded execution time. When it gets to the time for the advanced preview command, the control apparatus 100 outputs in advance the command that needs the preparation time to thereby shorten the preparation time. Since the test operation is always performed when machinery including the industrial machine 40 is used, it is possible to obtain accurate execution time when the machine is actually operated, without increasing the burden on the user. Moreover, the obtainment of the execution time at the beginning of the operation of the machine allows to increase the accuracy step by step.

Since the industrial machine 40 is actually operated to obtain the execution time, no complex software, such as simulator, is necessary. In addition, it is difficult to measure the specific commands created by the user by the simulator based on the program. By actually operating the industrial machine 40, the execution time can be obtained immediately.

The command for outputting the advanced preview command is generated and incorporated into the program, thereby eliminating the need for determining the timing to output the command in advance during executing the program and consequently enabling to reduce the load on the control apparatus 100. Furthermore, it permits the user to make fine adjustment of the command by rewriting the parameters.

In the embodiments shown in FIGS. 1 to 7 and FIG. 9, the control apparatuses 100, 100a to 100f are configured to include the drive control unit 20. However, the control apparatus, such as numerical control apparatus 100g, and the drive control unit, such as motor controller 20a, may be provided separately, as with those in the embodiment shown in FIG. 10. In addition to that, the control apparatuses 100, 100a to 100f are provided separately from the industrial machine 40 in the embodiment of FIG. 10, but may be incorporated into the industrial machine 40. Moreover, the control apparatus of this embodiment is provided with the program memory, but may read out the program stored in a transportable record medium or obtain the program stored on a network. Furthermore, the advanced preview command outputting section 107 may be provided to the drive control unit 20, instead of the control apparatus 100.

As to the machine tool, for instance, the execution time of one command for microfabrication may be very short. In such a case, the execution time can be recorded by a predetermined number of commands. For example, if the execution time is recorded every 10 commands, the execution time will be recorded by command 1 to command 10, command 11 to command 20 and so on.

Figure 14:
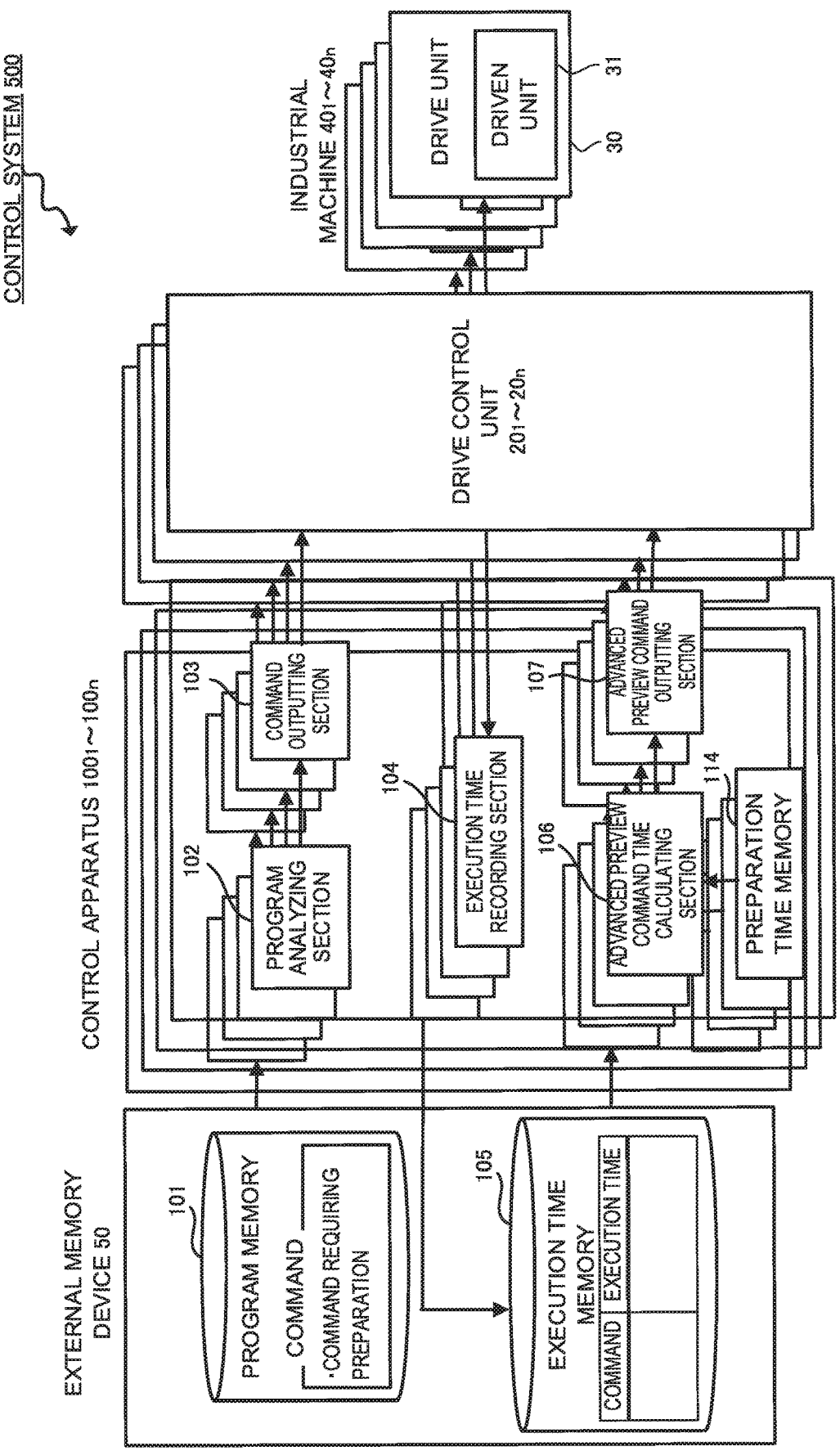
FIG. 14 is a diagram showing a configuration of a control system according to an embodiment.
Figure 15:
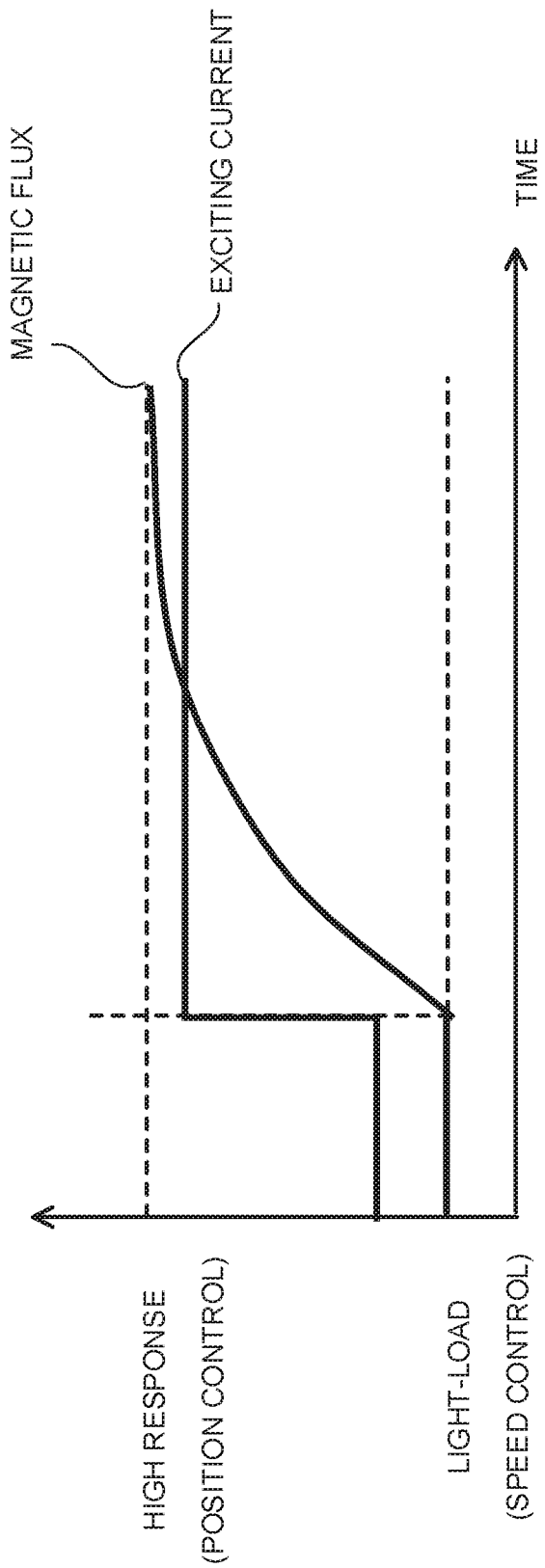
FIG. 15 is a diagram showing a delay in the rise of the magnetic flux with respect to the rise of exciting current.

A control system 500 shown in FIG. 14 stores the program as well as the execution time in an external storage device 50. A control system 500 of an embodiment includes a plurality of numerical control apparatuses $100_1$ to $100_n$, and a plurality of industrial machines $40_1$ to $40_n$ which are controlled by the respective control apparatuses. The numerical control apparatuses $100_1$ to $100_n$ are connected to the external storage device 50. The external storage device 50 may be a transportable storage medium or may be capable of being communicated over a wide area or local area network.

The external storage device 50 has the program memory 101 and the execution time memory 105. The external storage device 50 can store massive data. When the operation of the industrial machine 40 is complicated, the amount of data of the programs and commands increases, whereby the amount of data of the execution time which corresponds to the commands increases. In the machine tool, the number of commands becomes large when performing processing with a curved surface shape approximated by minute fine segments. In this case, the use of a high-capacity external storage device allows to handle significant increase in the programs and the amount of data of the execution time.

Furthermore, when the same type of industrial machines 40 execute the same program, it is conceivable that the execution time will be the same. Thus, by setting the advanced preview command time by one industrial machine 40, there will be no need to set the advanced preview command time in the test operation or initiation of the operation of the other industrial machines 40.

The present invention has been described with reference to the above embodiments, but is not limited by these embodiments. Those skilled in the art may modify the embodiments appropriately to implement the invention in various ways.

The invention claimed is:

1. A control apparatus that outputs to an industrial machine a series of commands including a command which requires preparation time to activate the industrial machine, comprising:
    an execution time recording section that actually activates the industrial machine to record a command for the industrial machine and time the industrial machine actually operates based on the command, in association with each other;
    an advanced preview command time calculating section that calculates advanced preview command time by subtracting the preparation time from time to start the execution of the command requiring the preparation time based on the time recorded in the execution time recording section; and
    an advanced preview command outputting section that outputs in advance the command requiring the preparation time based on the advanced preview command time.

2. The control apparatus according to claim 1, comprising:
    a command identifying section that identifies a command for operating the industrial machine at the advanced preview command time based on the time the industrial machine actually operates; and
    a waiting time calculating section that calculates time from when the industrial machine is activated based on the identified command until when the advanced preview command time comes, wherein
    the advanced preview command outputting section outputs the command requiring the preparation time based on the time calculated by the waiting time calculating section, after the activation of the industrial machine based on the identified command.

3. The control apparatus according to claim 2, comprising a command generator that generates a command for outputting an advanced preview command based on the advanced preview command time to add it to the command identified by the command identifying section.

4. The control apparatus according to claim 1, comprising:
    a command identifying section that identifies a command for operating the industrial machine at the advanced preview command time based on the time the industrial machine actually operates; and
    an advanced preview command position recording section that records a position of a driven unit of the industrial machine at the advanced preview command time during the operation of the industrial machine based on the identified command, wherein
    the advanced preview command outputting section outputs the command requiring the preparation time based on the position of the driven unit recorded in the advanced preview command position recording section.

5. The control apparatus according to claim 1, further comprises:
    a command identifying section that identifies a command for operating the industrial machine at the advanced preview command time based on the time the industrial machine actually operates; and
    a speed recording section that records a speed of the driven unit of the industrial machine at the advanced preview command time during the operation of the industrial machine based on the identified command, wherein
    the advanced preview command outputting section outputs the command requiring the preparation time of the driven unit based on the speed recorded in the speed recording section.

6. The control apparatus according to claim 1, comprising:
    a speed changing section that changes the speed to allow the industrial machine to operate twice as fast as the speed designated by the command; and
    an execution time adjusting section that adjusts operation time adjusted by the speed changing section to be unchanged normal operation time, wherein
    the execution time recording section records the time adjusted by the execution time adjusting section as time of the actual operation of the industrial machine.

7. The control apparatus according to claim 1, wherein the industrial machine comprises an induction motor,
the control apparatus comprising a preparation time setting section that sets a multiple of a time constant of the induction motor as the preparation time.

8. The control apparatus according to claim 7, wherein if there is a command for switching control of the induction motor from speed control to position control, exciting current in the induction motor is increased based on advanced preview command time of the concerned command to continue the speed control before starting an operation based on the command, and the speed control is switched to the position control when the operation based on the command is started.

9. The control apparatus according to claim 1, comprising a preparation time setting section that sets the preparation time of the command based on the time of the actual operation of the industrial machine.

10. A control system that outputs to an industrial machine a series of commands including a command which requires preparation time to activate the industrial machine, comprising:
an execution time memory that actually activates the industrial machine to record a command for the industrial machine and time the industrial machine actually operates based on the command, in association with each other;
an advanced preview command time calculating section that calculates advanced preview command time by subtracting the preparation time from time to start the execution of the command requiring the preparation time based on the time stored in the execution time memory; and
an advanced preview command outputting section that outputs in advance the command requiring the preparation time based on the advanced preview command time.

11. The control system according to claim 10, wherein the control system is for controlling a plurality of industrial machines, in which
the execution time memory actuates at least of the plurality of industrial machines to store a command for the industrial machine and time of an actual operation of the industrial machine based on the command, in association with each other,
the advanced preview command time calculating section calculates advanced preview command time by subtracting the preparation time from time to start the execution of the command requiring the preparation time based on the time stored in the execution time memory when the at least one of the industrial machines is actually operated, and
each of the advanced preview command outputting section of the industrial machines other than the at least one of the industrial machines outputs in advance the command requiring the preparation time based on the advanced preview command time.

* * * * *